May 5, 1953  T. L. KENDALL ET AL  2,637,209
ELECTROLYTE LEVEL INDICATOR
Filed Sept. 23, 1950

INVENTORS
THOMAS L. KENDALL
DONALD P. GENTRY
BY
THEIR ATTORNEYS

Patented May 5, 1953

2,637,209

UNITED STATES PATENT OFFICE 2,637,209

ELECTROLYTE LEVEL INDICATOR

Thomas L. Kendall and Donald P. Gentry, Muncie, Ind., assignors to General Motors Corporation, Detroit, Mich., a corporation of Delaware Application September 23, 1950, Serial No. 186,410

1 Claim. (Cl. 73—327)

This invention relates to battery electrolyte level indicators and is particularly concerned with level indicators for use with a storage battery wherein the level of the electrolyte therein may be checked externally of the battery without removal of the cell cover filler cap.

It is, therefore, the basic object of the present invention to provide a level indicator which may be used for visually checking the level of the electrolyte within a battery cell wherein the level indicator is visible externally of the cell without removal of the filler cap.

Another object of the invention is to provide an electrolyte level indicator for use with a storage battery wherein the level of the electrolyte in each cell of the storage battery may be determined externally thereof whereby batteries such as are used in trucks, busses and the like may be checked without removing the batteries from the battery compartment which normally has insufficient head room to permit inspection without such removal.

In carrying out the above object, it is a further object of the invention to provide an electrolyte level indicator consisting of a rod of transparent material such as glass, methyl methacrylate resin or other synthetic resin which is not attacked by battery acid, which rod has a facet-like face thereon at an angle 45° from the central axis of the rod whereby the level of the electrolyte is visibly apparent on said face from the side of the battery.

A still further object of the invention is to provide an electrolyte level indicator consisting of a rod of light transmitting material having facet-like reflecting surfaces at opposite ends thereof in planes rotated 90° from one another and arranged so that electrolyte contacting the lower surfaces reduces the reflecting areas thereof, the extent of which is visible at the upper surfaces.

Further objects and advantages of the present invention will be apparent from the following description, reference being had to the accompanying drawing, wherein preferred embodiments of the present invention are clearly shown.

Storage batteries must periodically be checked to determine the electrolyte level. This level should be maintained above the plates in order to secure satisfactory and continued operation of the battery. It is highly desirable that the level be maintained within reasonably close limits so that the volume of acid in each battery cell is substantially the same at all times.

Various expedients have been proposed to fulfill this necessity, however, in most cases, the level of the electrolyte in a battery cell is determined by removing the cap of the cell and observing the electrolyte level therein. This method of test is not in any way accurate since the level may vary considerably when viewed through the filler cap opening according to the observer.

It is, therefore, desirable to have an electrolyte level indicator which indicates the battery electrolyte level when viewed externally of the battery. In some cases, it is necessary that this electrolyte level check be made from the side of the battery. This last necessity is brought about by the installation of batteries in busses, trucks and similar heavy vehicles wherein a bank of batteries is generally used which is positioned in a compartment at the side of the bus or beneath the chassis thereof, access to which is obtained by removal of the side panel of the body. In these installations, there is no head room to permit a service man to view the electrolyte level through the filler cap openings and it is necessary to actually remove the battery unless a satisfactory level indicator is provided.

Level indicators of the rod type are admittedly not new and numerous designs have been proposed for use with fluid reservoirs of various types wherein the level may be checked by viewing the indicator. However, in all cases so far as we are able to determine, these indicators have not been satisfactory from a side observation angle, requiring a direct view from the top in order to determine the fluid level.

This invention is basically directed to a new type of indicator which is easy to install, inexpensive to fabricate and which operates satisfactorily when viewed from the top or side of the battery.

Figure 1:
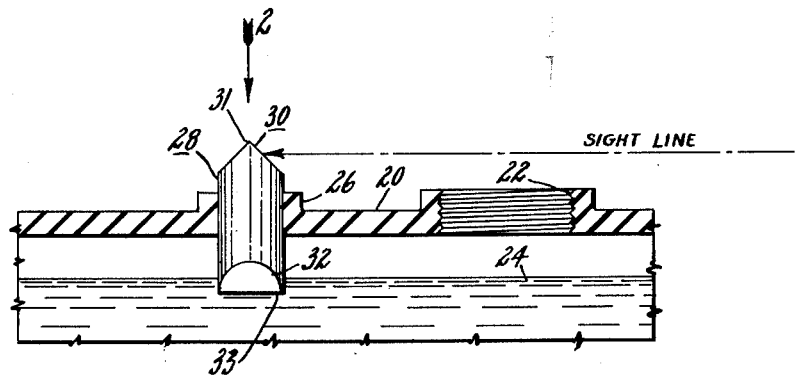
Fig. 1 is a fragmentary view in cross section of a battery cell showing the level indicator in place in relation to the cell cover and the electrolyte within the cell.
Figure 2:
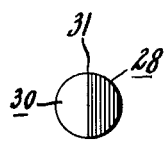
Fig. 2 is a top view of the level indicator shown in Fig. 1.

Referring specifically to the drawings, a preferred embodiment of the invention is shown in Fig. 1, wherein a portion of a battery cell cover is shown at 20 having a filler cap opening 22 and wherein the electrolyte is indicated at 24. A boss 26 is preferably provided on the battery cover through which the indicator 28 is pressed. The indicator 28 preferably consists of a cylindrical rod of transparent material, such as methyl methacrylate resin, which has facet-like upper faces at 30 formed by two plane surfaces which meet at a knife edge 31. The lower end of the indicator shown at 32 is exactly similar to the upper end except that the facet-like faces are cut so that knife edge 33 is 90° displaced from the knife edge 31 of the upper face 30. The angle between the upper faces is preferably less than the angle between the lower faces and these angles may range anywhere from 30° to 60°. In each case, it is best to arrive at the desired angles by trial in the specific application wherein the angle of sight may be easily determined. Obviously, the angles will also vary due to the variation in the index of refraction of the material. In all cases, proper balance between the angles of the end faces of the indicator will yield easier visibility and will make the indication of electrolyte level more visible on the upper faces of the indicator. It is to be understood that, in most instances, the angles are not particularly critical to the indication of the electrolyte level but are important due to line of sight, since in passenger cars for example, the battery may be viewed from almost any angle whereas in busses and trucks, if the battery is in a compartment, the angle of sight is in a plane substantially parallel to the top of the battery.

As the battery acid contacts the knife edge 33, a black line will appear on the face 30 directly in the center thereof and, as the acid rises on the face 32, this line will increase in width until it extends completely across the upper face 30. At this point, the electrolyte will have reached the cylindrical section of the indicator.

In practice, the indicator 28 is placed in the battery in such a manner that a facet-like portion of face 30 is visibly apparent from the side of the battery so that it is a simple matter to observe the face and determine exactly where the electrolyte stands in the battery. If the face 30 shows white, the level of the electrolyte is below the internal portion of the indicator. If the face includes a black line in the center thereof, the electrolyte of the level is adjacent the bottom end of the indicator. However, if the face is black, the electrolyte is at its top level.

In this manner, it is possible for a service man when adding water to a battery cell, to determine just where the electrolyte stands and there is no guess work necessary as is the case with the prior art indicators.

The boss 26 on the cell cover may be eliminated if the thickness of the cover is sufficient to provide a tight seal. Also, in all cases, the aperture through boss and cell cover preferably includes a slight taper to hold the indicator firmly in the cover. This may be aided by application of cement. In any event, the specific application of the indicator to the cell cover forms no part of this invention as it obviously can be accomplished in a number of suitable ways.

The present invention provides the means for determining the electrolyte level in the battery cell in an accurate manner. The indicator disclosed permits the service man to bring the level up gradually as is apparent on the indicator until such time that the electrolyte is at the proper height. The invention indicates electrolyte level from the side or the top of the battery, thereby expanding its use to any type of battery.

In some cases, it may be desirable to tint the material to facilitate use of the indicator, for example methyl methacrylate resin, glass and other light transmitting materials may be tinted red, yellow, blue, etc., whereby explanation of the use of the indicator is facilitated since if a red spot, for example, is apparent on the surface of the cell cover, the battery needs water whereas if the entire surface battery cell cover appears black, the level is up to normal.

While the embodiments of the present invention as herein disclosed, constitute preferred forms, it is to be understood that other forms might be adopted.

What is claimed is as follows:

A battery level indicator adapted to be inserted through the cell cover of a battery cell, comprising in combination, a rod-like body member of light transmitting, acid resisting material having an upper face formed by two oppositely angled plane surfaces terminating in a knife edge extending across the body portion, the bottom end thereof having two similar angled surfaces rotated in a plane 90° from the plane of the upper surfaces, whereby the knife edges of upper and lower surfaces are crossed.

THOMAS L. KENDALL.
DONALD P. GENTRY.

References Cited in the file of this patent

UNITED STATES PATENTS

| Number | Name | Date |
|---|---|---|
| 1,883,971 | Kryzanowsky | Oct. 25, 1932 |
| 2,123,479 | Spencer | July 12, 1938 |

FOREIGN PATENTS

| Number | Country | Date |
|---|---|---|
| 412,803 | Great Britain | July 5, 1934 |